United States Patent
Hwang et al.

[19]

[11] Patent Number: 5,918,324
[45] Date of Patent: Jul. 6, 1999

[54] WATER SAVING TWO-STAGE TOILET

[76] Inventors: Ming-Chang Hwang; Sheng-Lung Ma, both of P.O. Box 23-487, Changhua City 500, Taiwan

[21] Appl. No.: 09/124,022

[22] Filed: Jul. 29, 1998

[51] Int. Cl.$^6$ ........................................................ E03D 1/14
[52] U.S. Cl. ........................... 4/324; 4/405; 4/384; 4/412; 4/415
[58] Field of Search ................................ 4/324, 378, 379, 4/381, 382, 384, 385, 393, 395, 405, 412, 413, 414

[56] References Cited

U.S. PATENT DOCUMENTS

| | | | |
|---|---|---|---|
| 2,487,315 | 11/1949 | Crampton | 4/405 |
| 5,206,960 | 5/1993 | Hooshley et al. | 4/384 |
| 5,400,445 | 3/1995 | Hull | 4/405 |
| 5,680,659 | 10/1997 | Gessaman | 4/405 |

*Primary Examiner*—Henry J. Recla
*Assistant Examiner*—Khoa D. Huynh

[57] ABSTRACT

A two-stage toilet is composed of a handle switching device, a locating and fastening device, a water adjusting device, and a water stopping valve device. The handle switching device consists of a camshaft on which the locating and fastening device and the water adjusting device are mounted. The water adjusting device comprises a cord pulling rod for actuating a transmission cord of the water stopping valve device. The water adjusting device is composed of a retaining slot and a retaining block which is retained in the retaining slot at the time when the flush handle of the toilet is pressed to cause the water stopping valve of the water stopping valve device to remain open to permit the flushing until such time when the water adjusting block of the water adjusting device is so actuated by a float ball as to bring about the disengagement of the retaining block with the retaining slot, thereby resulting in an interruption of the flushing.

5 Claims, 7 Drawing Sheets

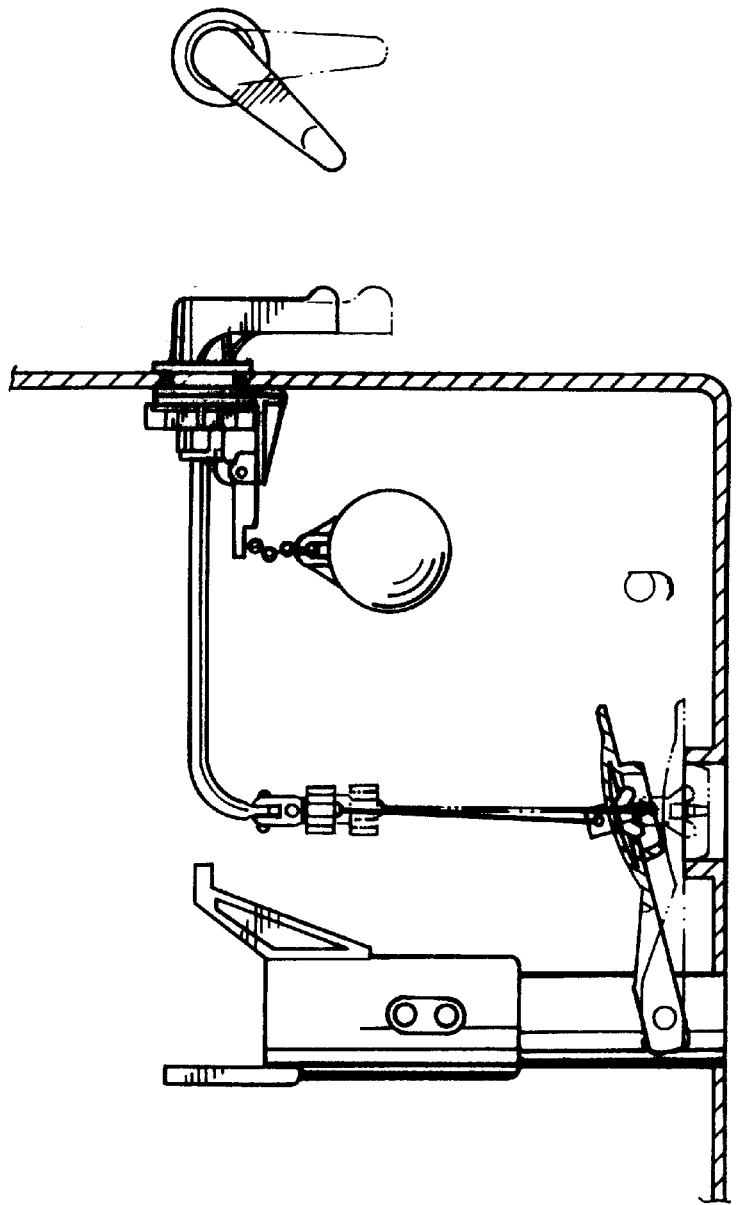
FIG 8
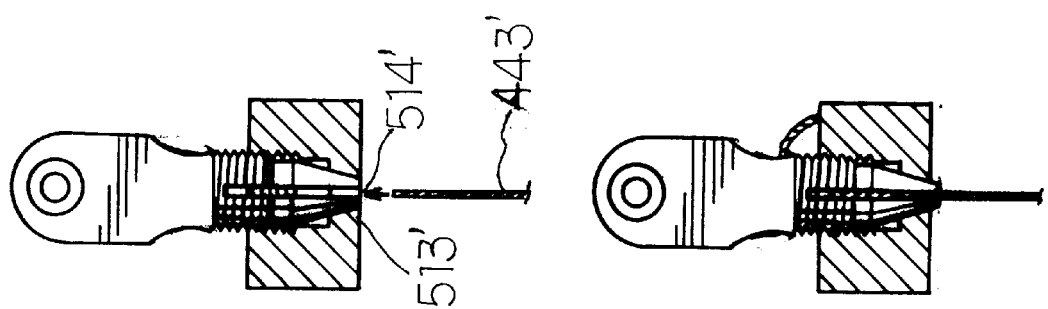

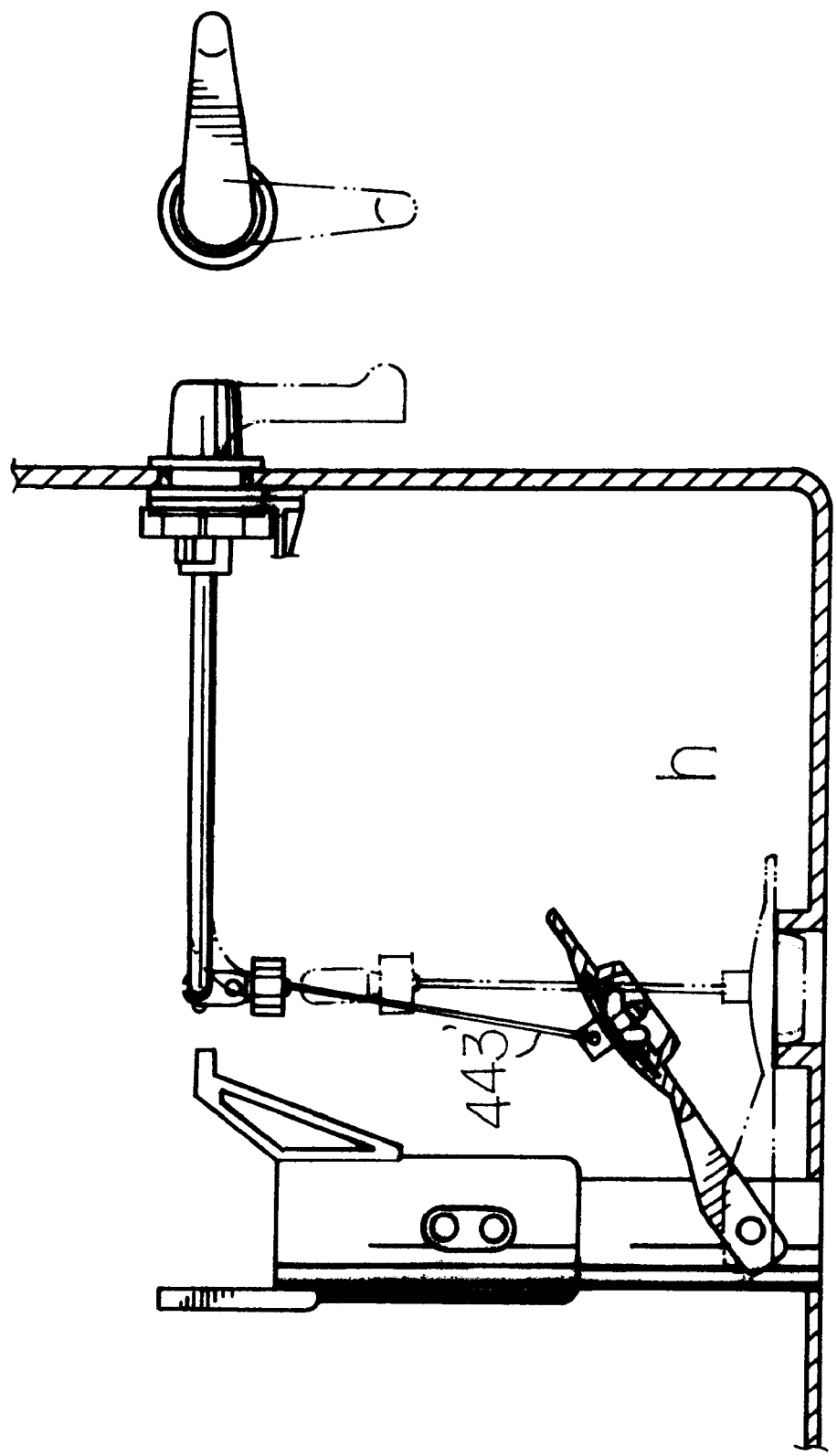

WATER SAVING TWO-STAGE TOILET

FIELD OF THE INVENTION

The present invention relates generally to a toilet, and more particularly to a two-stage toilet capable of flushing water in a two-stage manner for conserving water.

BACKGROUND OF THE INVENTION

There are a variety of two-stage toilets available in the market place today. However, the conventional two-stage toilets are incapable of cleaning effectively the toilet bowl in light of their structural deficiencies. For example, the amount of water that is flushed in the first stage of the conventional two-stage toilets is too inadequate to clean the toilet bowl. In addition, the conventional two-stage toilets are complicated in construction and cumbersome in size. As a result, the conventional two-stage toilets are not cost-effective at best. Moreover, the conventional two-stage toilets do not conserve water effectively.

SUMMARY OF THE INVENTION

The primary objective of the present invention is therefore to provide an improved two-stage toilet free from the drawbacks of the conventional two-stage toilets described above.

In keeping with the principle of the present invention, the foregoing objective of the present invention is attained by a two-stage toilet which is provided with a handle switching device, a locating and fastening device, a water adjusting device, and a water-stopping valve device. The handle-switching device consists of a camshaft on which the locating and fastening device and the water adjusting device are mounted. The water adjusting device comprises a cord pulling rod for fastening, a transmission cord of the water stopping valve device. The opening and the closing of the water-stopping valve is actuated by the cord pulling rod via the transmission cord. The water adjusting device is composed of a retaining slot and a retaining block, which is retained in the retaining slot at the time when the flush handle of the toilet is pressed, thereby causing the water-stopping valve to remain open to permit the flushing until such time when a water-adjusting block of the water adjusting device is so actuated by the float ball of the toilet as to bring about the disengagement of the retaining block with the retaining slot such that the water-stopping valve is closed to interrupt the flushing.

The foregoing objective, features, functions, and advantages of the present invention will be more readily understood upon a thoughtful deliberation of the following detailed description of two preferred embodiments of the present invention with reference to the accompanying drawings.

BRIEF DESCRIPTION OF THE DRAWINGS

FIG. 8 shows a schematic view of a small flushing of the second preferred embodiment of the present invention.

FIG. 9 shows a schematic view of a large flushing of the second preferred embodiment of the present invention.

DETAILED DESCRIPTION OF THE EMBODIMENTS

Figure 1:
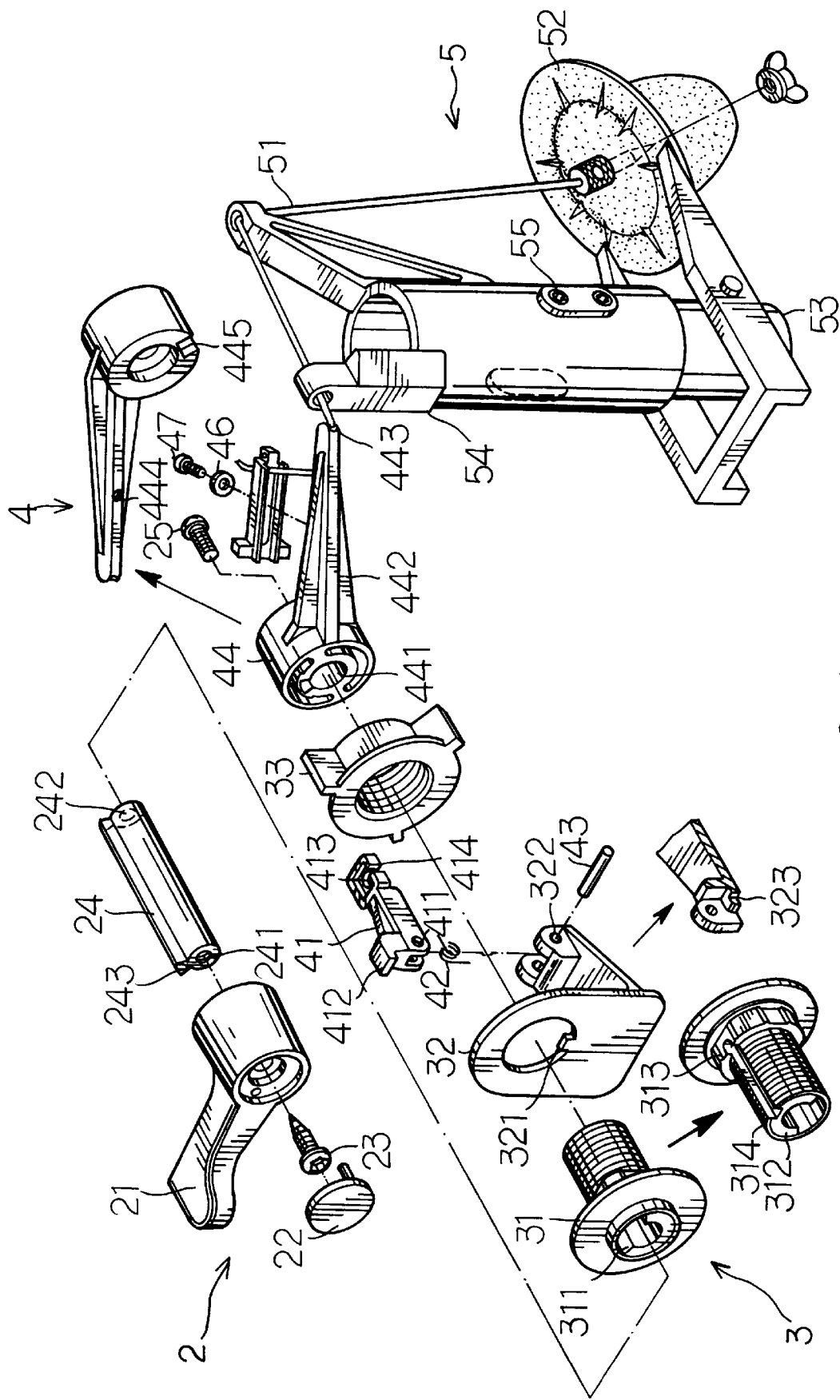
FIG. 1 shows an exploded view of the present invention.
Figure 2:
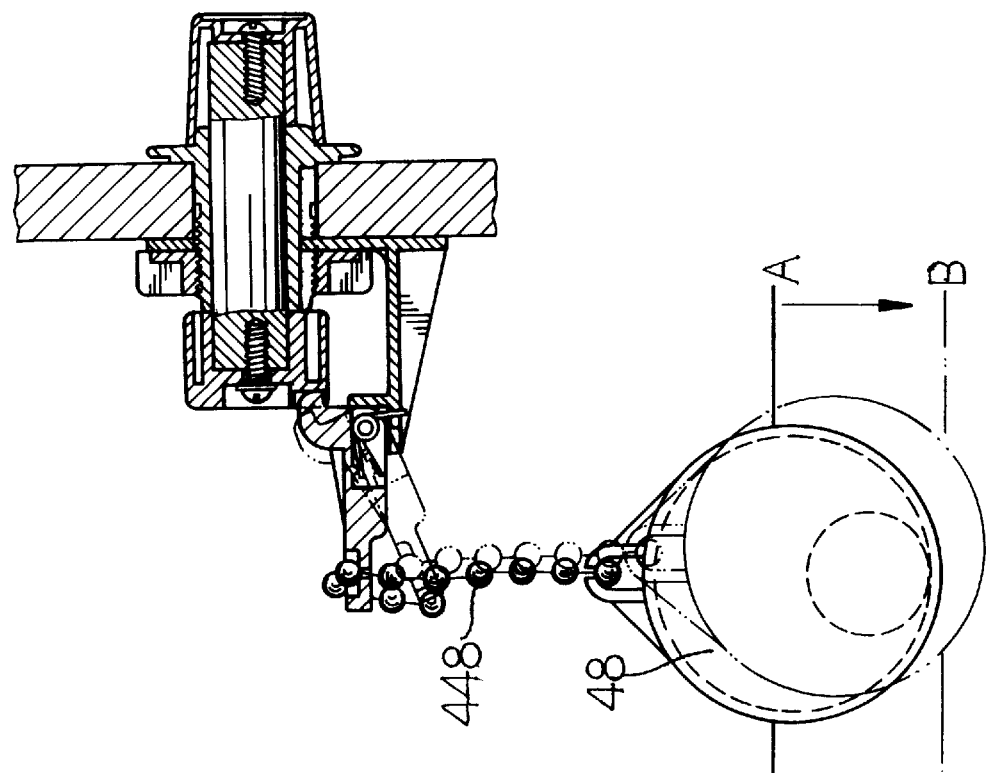
FIG. 2 shows a side sectional view of the present invention in combination.

As shown in FIGS. 1 and 2, a two-stage toilet 1 embodied in the present invention is composed of a handle switching device 2, a locating and fastening device 3, a water adjusting device 4, and a water stopping valve device 5.

The handle switching device 2 consists of a camshaft 24 which is provided at both longitudinal ends thereof with threaded holes 241 and 242, and of the outer wall thereof with a rib 243 extending from one longitudinal end to another longitudinal end of the camshaft 24. The camshaft 24 is fastened at one longitudinal end thereof with a flush handle 21 by a fastening screw 23 which is engaged with the threaded hole 241 of the camshaft 24. The head of the screw 23 is provided with a cap 22 attached thereto. The locating and fastening device 3 and the water-adjusting device 4 are mounted on the camshaft 24. The threaded hole 242 of the camshaft 24 is engaged with a locating screw 25 for locating the devices 3 and 4 on the camshaft 24.

The locating and fastening device 3 is composed of a position confining body 31, a support frame 32, and a winged nut 33. The position confining body 31 is provided with a through hole 311 having a sectoral cross section, a threaded portion 314, a locating slot 312, and a plurality of ribs 313 capable of cooperating with a water tank hole 11. The support frame 32 of an L-shaped construction is provided with a hole for receiving the position confining body 31. The hole is provided with a locating protuberance 321 which is retained in the locating slot 312, two connection holes 322, and a recess 323. The position confining body 31 is fastened by the winged nut 33.

The water adjusting device 4 is composed of a water level adjusting block 41, a torsion spring 42, a locating pin 43, and a cord pulling rod 44. The water level adjusting block 41 is provided with a retaining block 412, two locating holes 411, a spherical hole 413, and an admission hole 414. The retaining block 41, the support frame 32 and the torsion spring 42 are held together by the locating pin 43. The cord pulling rod 44 is provided with a through hole 441, a retaining slot 445, an arm rod 442, a cord hole 443, and a threaded hole 444. The adjusting block 45 is located on the arm rod 442 by an adjusting screw 47 and a washer 46.

The water stopping valve device 5 is composed of a transmission cord 51 and a water stopping valve 52. The transmission cord 51 is actuated by the adjusting block 45. In other words, the water stopping valve 52 is actuated by the transmission cord 51 such that the water stopping valve 52 is opened or closed.

Figure 3:
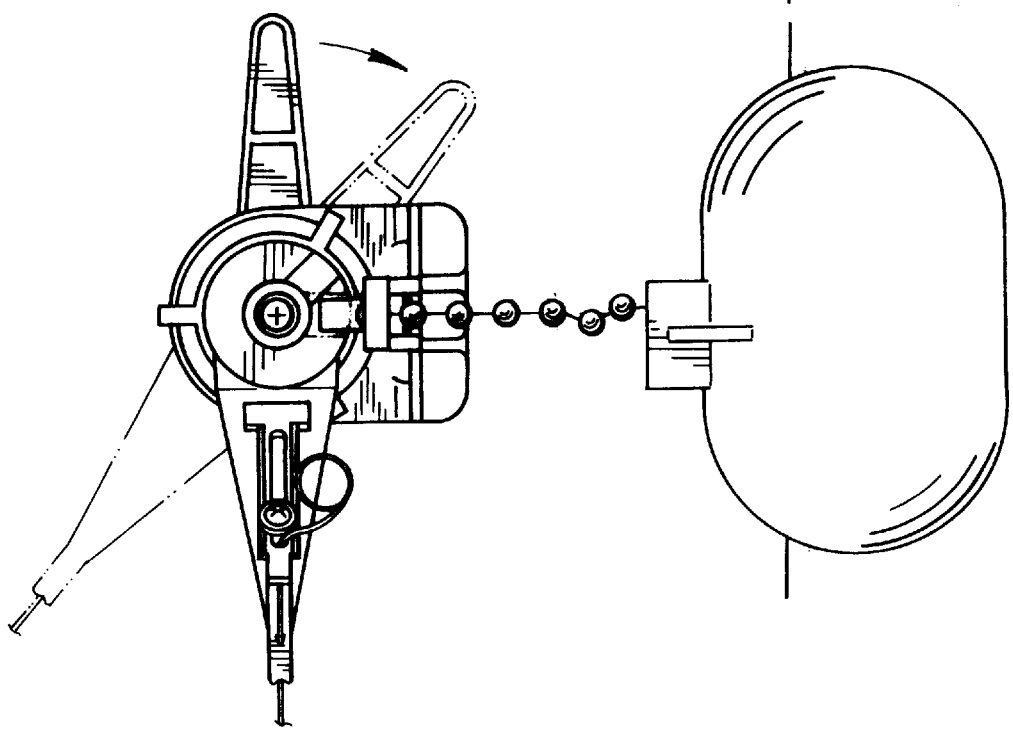
FIG. 3 shows a front schematic view of the present invention at work.
Figure 4:
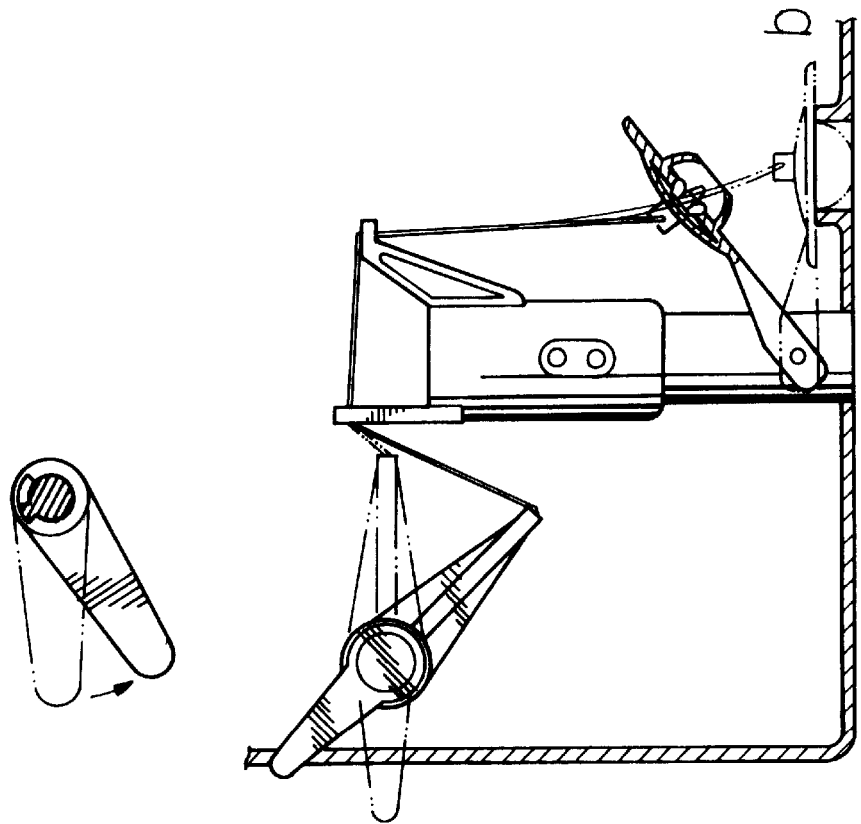
FIG. 4 shows a schematic view of a large flushing of the present invention.
Figure 5:
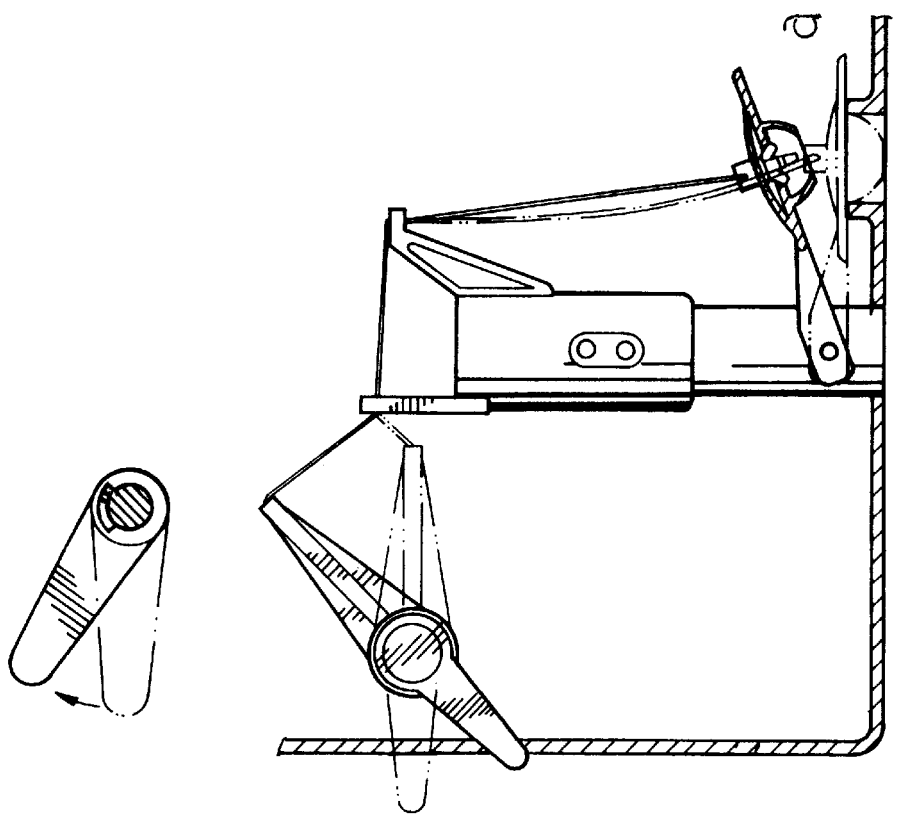
FIG. 5 shows a schematic view of a small flushing of the present invention.

As illustrated in FIGS. 4 and 5, when a large flushing is desired, the flush handle 21 is lifted such that the water stopping valve 52 is actuated by the transmission cord 51 to remain open to a fullest extent. When a small flushing is desired, the flush handle 21 is pressed such that the water stopping valve 52 is opened partially to permit a small amount of water to clean the toilet bowl. As shown in FIGS. 2, 3, and 5, when the flush handle 21 is pressed and rotated, the cord pulling rod 44 is actuated to turn such that the transmission cord 51 is pulled down, and that the water stopping valve 52 is lifted. When the camshaft 24 is turned, the rib 243 of the camshaft 24 is turned in the sectoral through hole 311 of the position confining body 31. As the cord pulling rod 44 is turned, the retaining slot 445 of the cord pulling rod 44 is so turned as to engage the retaining block 412 of the water adjusting block 41. As a result, the cord pulling rod 44 is securely located such that the water stopping valve 52 remains open, even if the flush handle 21 is let go. As the water level is lowered to the B level, the float ball 48 is lowered such that the water level adjusting block 41 is pulled down, thereby causing the retaining block 412 to disengage the retaining slot 445. In the meantime, the cord pulling rod 44 and the flush handle 21 are caused to return to their original positions such that the water stopping valve 52 is closed. The water tank of the toilet is replenished with water such that the water level is raised to the A level, and that the float ball 48 is floated on the water surface, and further that the water adjusting block 41 is relieved of the pulling force.

As illustrated in FIGS. 3, 4, and 5, the opening angle of the water stopping valve 52 is dependent on the extent to which the transmission cord 51 is actuated by the cord pulling rod 44. The transmission cord 51 can be tightened or loosened by adjusting the screw 47. The opening angle of the water stopping valve 52 can be adjusted by adjusting the height of the cord pulling rod 44.

As illustrated in FIGS. 2, 3, and 5, when a small flushing is activated, the retaining block 412 is retained in the retaining slot 445 so as to keep the water stopping valve 52 to remain open until such time when the water level adjusting block 41 is pulled down by the float ball 48 such that the retaining block 412 is disengaged with the retaining slot 445, thereby causing the water stopping valve 52 is closed.

Figure 6:
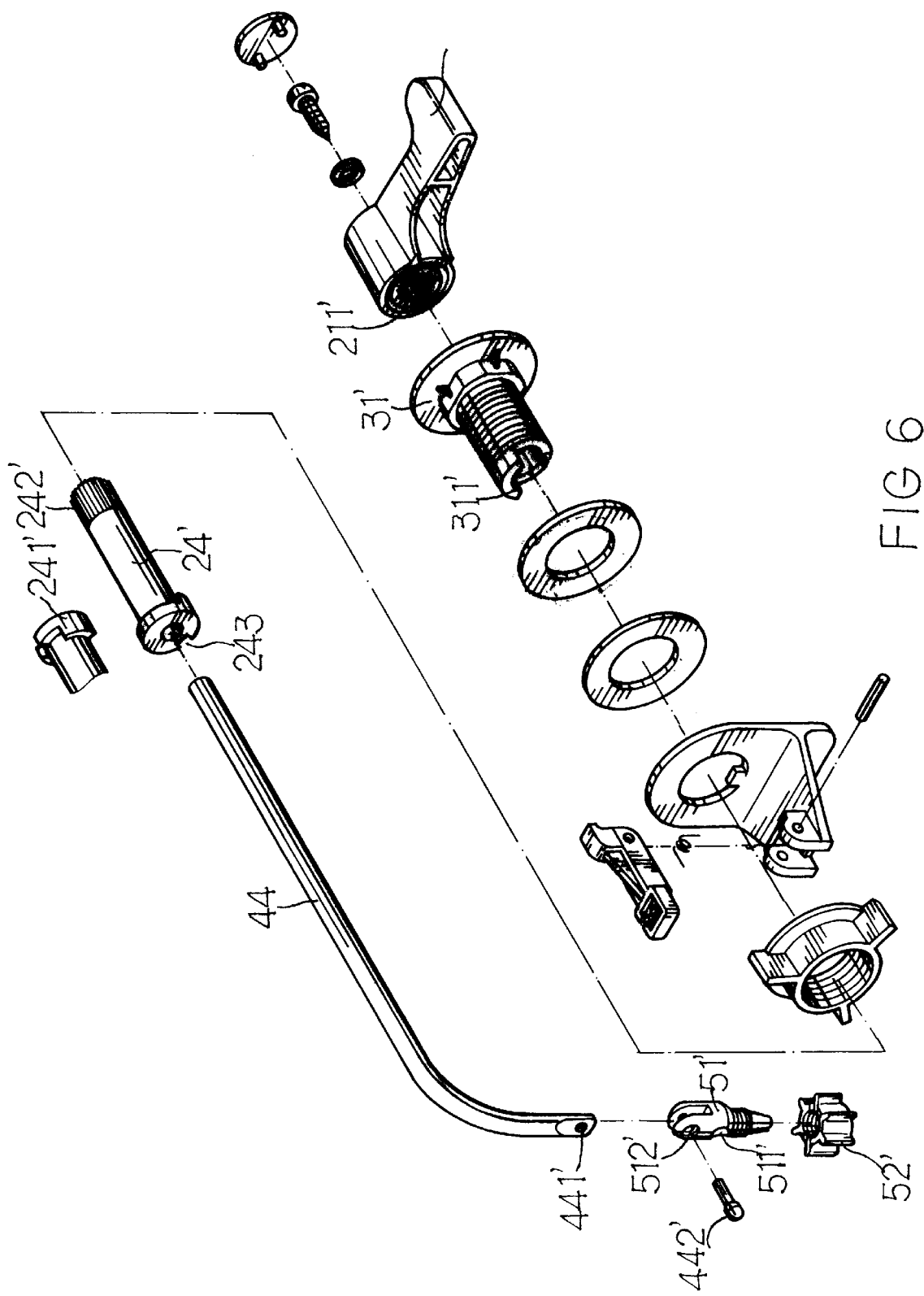
FIG. 6 shows an exploded view of another preferred embodiment of the present invention.
Figure 7:
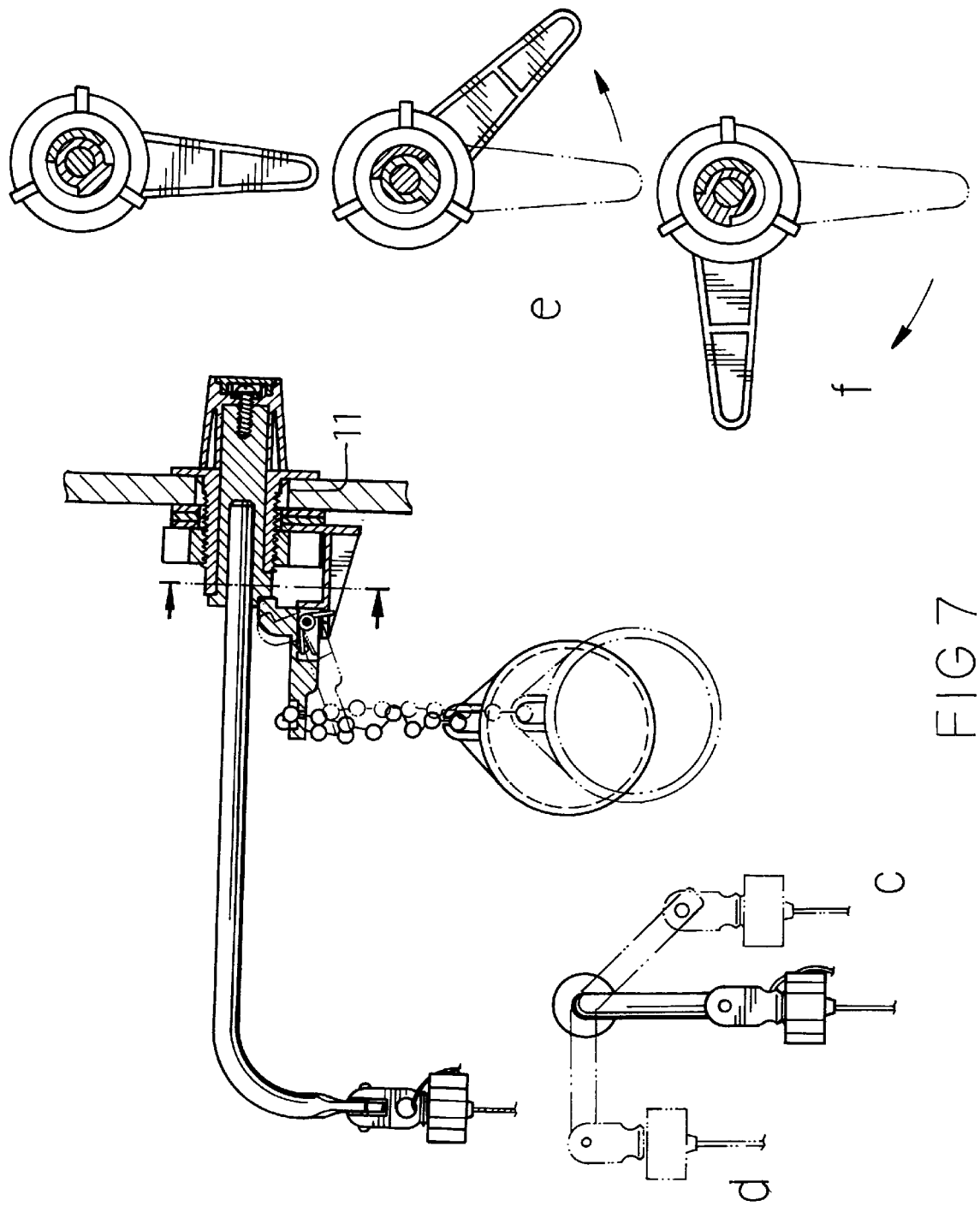
FIG. 7 shows a sectional schematic view of the second preferred embodiment of the present invention in operation.

As shown in FIGS. 6 and 7, a two-stage toilet 1' of another embodiment of the present invention is composed of a locating and fastening device 3' consisting of a male position confining body 31' provided with a sectoral protuberance 311', an axle 24' provided at one end thereof with a small toothed section 242' which is engaged with a small toothed slot 211' of a flush handle 21'. The axle 24' is further provided at other end thereof with a retaining slot 243' and a retaining block 241'. A cord pulling rod 44' is provided with a through hole 441' and is fastened with an adjusting device 5' by a fastening pin 442'. As illustrated in FIGS. 7–9, the cord pulling rod 44' is actuated by pushing the handle 21' forward or backward such that the transmission cord 443' is lifted to cause the water stopping valve 52 to open so as to permit water to enter the toilet bowl. When the handle 21' is turned, the axle 24' and the retaining block 24' are also caused to turn such that they are confined by the sectoral protuberance 311' of the male position confining body 31'. The retaining block 241' and the sectoral protuberance 311' are engaged to bring about the large flushing or the small flushing.

As shown in FIGS. 8 and 9, an adjusting device 5' of the second embodiment of the present invention is composed of an adjustment shaft 51' which is provided with a pin hole 512', a cord admission hole 514', and a cord exit hole 511'. A transmission cord 443' is fastened with the adjusting device 5' by a fastening nut 52'.

The embodiments of the present invention described above are to be deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A two-stage toilet comprising:

a handle switching device consisting of a camshaft which is provided at both longitudinal ends thereof with a threaded hole, and on an outer wall thereof with a rib extending along the direction of a longitudinal axis of said camshaft, said camshaft being fastened at one end of said longitudinal axis thereof with a flush handle by a fastening screw which is engaged with said threaded hole of said camshaft;

a locating and fastening device mounted on said camshaft of said handle switching device and composed of a position confining body, a support frame, and a winged nut, said position confining body provided with a sectoral through hole, a threaded portion, a locating slot, and a plurality of ribs capable of cooperating with a water tank hole of said two-stage toilet, said support frame provided with a through hole for receiving said position confining body, said through hole of said support frame provided with a locating protuberance which is retained in said locating slot, said support frame further provided with two connection holes and a recess;

a water adjusting device mounted on said camshaft of said handle switching device and composed of a water level adjusting block, a torsion spring, a locating pin, and a cord pulling rod, said water level adjusting block provided with a retaining block, two locating holes, a spherical hole and an admission hole, said retaining block, said support frame of said locating and fastening device, and said torsion spring being held together by said locating pin, said cord pulling rod provided with a through hole, a retaining slot, an arm rod, a cord hole and a threaded hole; and a water stopping valve device composed of a transmission cord and a water stopping valve, said transmission cord capable of being actuated by said adjusting block of said water adjusting device such that said water stopping valve is actuated by said transmission cord.

2. The two-stage toilet as defined in claim 1, wherein said flush handle is capable of being lifted such that said water stopping valve is actuated by said transmission cord to remain open to a fullest extent; wherein said flush handle is capable of being pressed such that said water stopping valve is opened partially; and wherein said flush handle is capable of being pressed and rotated such that said cord pulling rod of said water adjusting device is actuated to pull down said transmission cord, and that said water stopping valve is lifted.

3. The two-stage toilet as defined in claim 1, wherein said water adjusting device is further composed of a float ball capable of actuating said water level adjusting block of said water adjusting device such that said retaining block of said water level adjusting block is disengaged with said retaining slot of said cord pulling rod.

4. The two-stage toilet as defined in claim 1, wherein said position confining body of said locating and fastening device is provided with a sectoral protuberance, and an axle provided at one end thereof with a toothed section; and wherein said flush handle is provided at one end thereof with a toothed slot which is engaged with said toothed section of said axle.

5. The two-stage toilet as defined in claim 4, wherein said axle is provided at other end thereof with a retaining slot and a retaining block capable of being confined by said sectoral protuberance of said position confining body of said locating and fastening device.

* * * * *